Patented Aug. 29, 1933

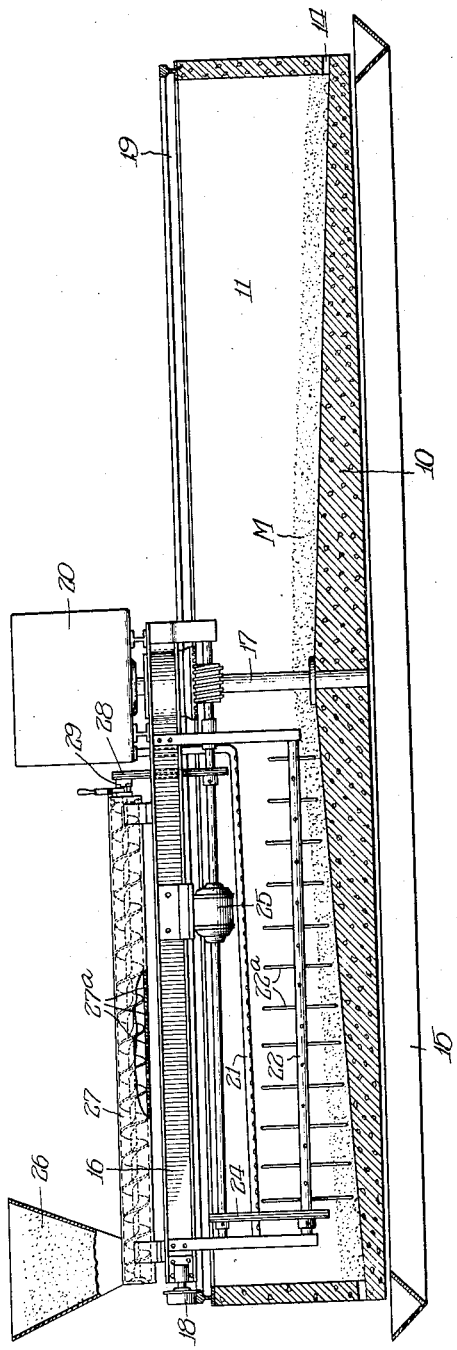

1,924,126

UNITED STATES PATENT OFFICE 1,924,126

APPARATUS FOR PRODUCTION OF OXIDES

Emil M. Lofland, Chicago, Ill.

Application April 30, 1928. Serial No. 273,838

9 Claims. (Cl. 23—287)

This invention relates to apparatus for the production of oxides from metals. The subject matter of the present application was originally a part of my copending application filed August 14, 1926, on which Letters Patent of the United States No. 1,689,951 were issued to me on October 30, 1928.

A general object of the present invention is the provision of an apparatus whereby oxides may be rapidly produced and recovered, as from metals, under controlled conditions.

Other and further objects will be indicated or pointed out hereinafter, or will appear to one skilled in the art on an understanding of the invention or its employment in practice.

For the purpose of aiding in the disclosure of the invention, I illustrate in the accompanying drawing, forming a part of this specification, one form of apparatus embodying the same, but it is to be understood that the invention is not limited to this particular construction or arrangement.

In the drawing the figure represents a sectional elevation of an apparatus, the illustration being largely diagrammatic.

An understanding of the invention may be had most quickly by reference to the example shown in the drawing. In this the reference numeral 10 designates a tank or basin, circular in form, with a bottom sloping from the center to the side wall 11. On top of the side wall is a rail 19 on which runs the flanged wheel 18 that supports the outer end of a revolving carriage 16. This carriage is supported at its inner end by a post 17 at the center of the basin. A motor 25, mounted on the carriage, drives suitable gearing whereby the carriage is revolved about the post 17. An agitator shaft 22 is journaled in brackets depending from the carriage frame, and carries stirring arms 22ª arranged to sweep with their outer ends in proximity to the bottom of the basin. Suitable driving connection 24 between the motor 25 and the agitator shaft 22 is provided, whereby the latter is rotated on its longitudinal axis. A screw conveyor 27 is mounted on the carriage, and is provided with discharge openings 27ª distributed along its length, so that fragmentary material fed into the conveyor from the hopper 26 may be discharged with suitable distribution over the bottom of the basin. The conveyor may be actuated through the medium of power transmitting means 28 driven by the motor 25, the effectiveness thereof upon the conveyor being controlled by a clutch device 29, so that the conveyor may be operated or left idle, as desired. A spray pipe 21 is supported on the carriage and extends radially of the basin, and is connected with a tank 20 from which liquid may be supplied to the spray pipe. The side 11 of the basin is provided with suitable discharge apertures 14 distributed thereabout, through which liquid may be drained from the bottom of the basin and discharged into a launder 15, from which it is conducted away.

As an illustration of the operation of the apparatus, I will describe its use for the production of an iron oxide. A bed of metallic iron in the form of fragments, such as iron borings, is distributed on the bottom of the basin in substantially uniform thickness. The material in the bed is then wetted by sprinkling it with water, or with a solution which will promote oxidation of the surface portions of the particles of iron in the bed. This sprinkling may be done by liquid discharged through the spray pipe 21 as the carriage 16 is revolved about the basin. The wetted iron is left exposed in the air for such a period of time as will permit the formation of a coating of oxide on the particles. The rate of rotation of the carriage 16 may be so timed as to afford the requisite period of exposure to the oxidizing action. The carriage is revolved about the post 17 by operation of the motor 25, and incident to this orbital travel of the carriage, the agitator shaft 22 is rotated to sweep the stirring arms 22ª energetically through the bed. This energetic stirring rubs the particles of iron in the bed upon one another, thus scouring off the oxide coating by attrition. At the same time, the particles which are being stirred in the bed are showered with the wetting liquid from the spray pipe 21, with the effect that the oxide which is scoured off of them is washed down through the bed and carried in the flow of the liquid down the sloping bottom and discharged through the apertures 14 into the launder. From this the liquid with its content of oxide is led away to a thickener in which the oxide is separated from the liquid and the liquid returned to the tank 20 for re-use. It will be understood that this stirring of the bed by the agitator and the flushing thereof with liquid from the spray pipe 21 goes on progressively incident to the revolution of the carriage, so that while the iron in one portion of the bed is being agitated and sprayed, that in the other portions of the bed remains at rest and exposed to the air to facilitate the process of oxidation, all of the material in the bed being subjected to the agitating and showering operation at regular intervals. It will be understood that after the submitting of the particles to the agitation as above described, and the spraying of them with the liquid, they remain in the wetted condition from the spraying, so that the process of oxidation of their now exposed surface portions is immediately resumed. The carriage may be maintained continuously in motion, its rate of travel being timed to allow for oxidation of the material in the bed to the desired extent. Thus, in the quiet portions of the bed the oxidation goes on continuously, while at the same time in the portion subjected to the action of the agitator, the detachment and recovery of the oxide goes on continuously. As the particles are gradually reduced in size by the formation and separation of the oxide, the bed is replenished by the distribution thereon of fresh particles of iron by operation of the conveyor 27. Consequently, it will be seen, the apparatus may be operated continuously to effect a continuous formation and recovery of the oxide.

What I claim is:

1. Metallurgical apparatus comprising, in combination, a basin adapted to support a bed of fragmentary material, an agitator having a reach limited to only a minor fraction of the basin's length, a carriage supporting the agitator and movable progressively over the basin to travel the agitator throughout the length of the bed, means for propelling the carriage, and means for imparting individual movement to the agitator to agitate localized portions of the bed energetically during progressive movement of the agitator and carriage and a liquid distributing device movable with the carriage in position to discharge liquid on the fractional portion of the bed undergoing agitation by the agitator, the basin being arranged for discharge of liquid from the bed.

2. Apparatus as specified in claim 1 and including also means on the carriage for distributing fragmentary material over the bed for replenishment thereof.

3. Metallurgical apparatus comprising, in combination, a basin adapted to support a bed of fragmentary material, a carriage movable progressively over the basin, an agitator rotatably mounted on the carriage and having stirring arms extending only a minor fraction of the bed's length, means for propelling the carriage progressively over the bed to transport the agitator throughout the entire length thereof, means for imparting rotary movement to the agitator to stir material in the bed energetically during progressive movement of the agitator with the carriage and a distributor carried by the carriage and adapted to shower liquid upon the localized area of the bed undergoing stirring by the agitator.

4. Apparatus for production of hydrous oxides comprising, in combination, a basin having a draining bottom, a carriage arranged to travel over the basin, an agitator carried by said carriage for operation in the basin, means for actuating the agitator and propelling the carriage, a distributor arranged to shower liquid into the basin in proximity to the agitator, and means for supplying liquid to the distributor during operation of the same and the agitator.

5. Apparatus as specified in claim 4 and including a conveyor carried by the carriage and operable to discharge comminuted material in the basin, and means for actuating the conveyor.

6. Apparatus as specified in claim 4 and including a trough into which the basin drains.

7. Apparatus as specified in claim 4 and in which the agitator has rotary operation on an approximately horizontal axis.

8. Apparatus as specified in claim 4 and including a discharge receptacle into which the basin drains, a liquid container associated with the basin, a distributor having supply connection with the liquid container and discharge outlet above the basin, and means for supplying liquid from the liquid container to the distributor.

9. Apparatus for production of hydrous oxides comprising, in combination, a basin having a sloping bottom for supporting a bed of material, a trough extending along the lower margin of the basin to receive material flushed therefrom, a carriage arranged to travel above the basin, an agitator extending across the basin and carried by the carriage for rotation on an approximately horizontal axis, means for actuating the agitator and propelling the carriage, and means for flushing the portions of the bed undergoing agitation by the agitator.

EMIL M. LOFLAND.